Patented Sept. 23, 1947

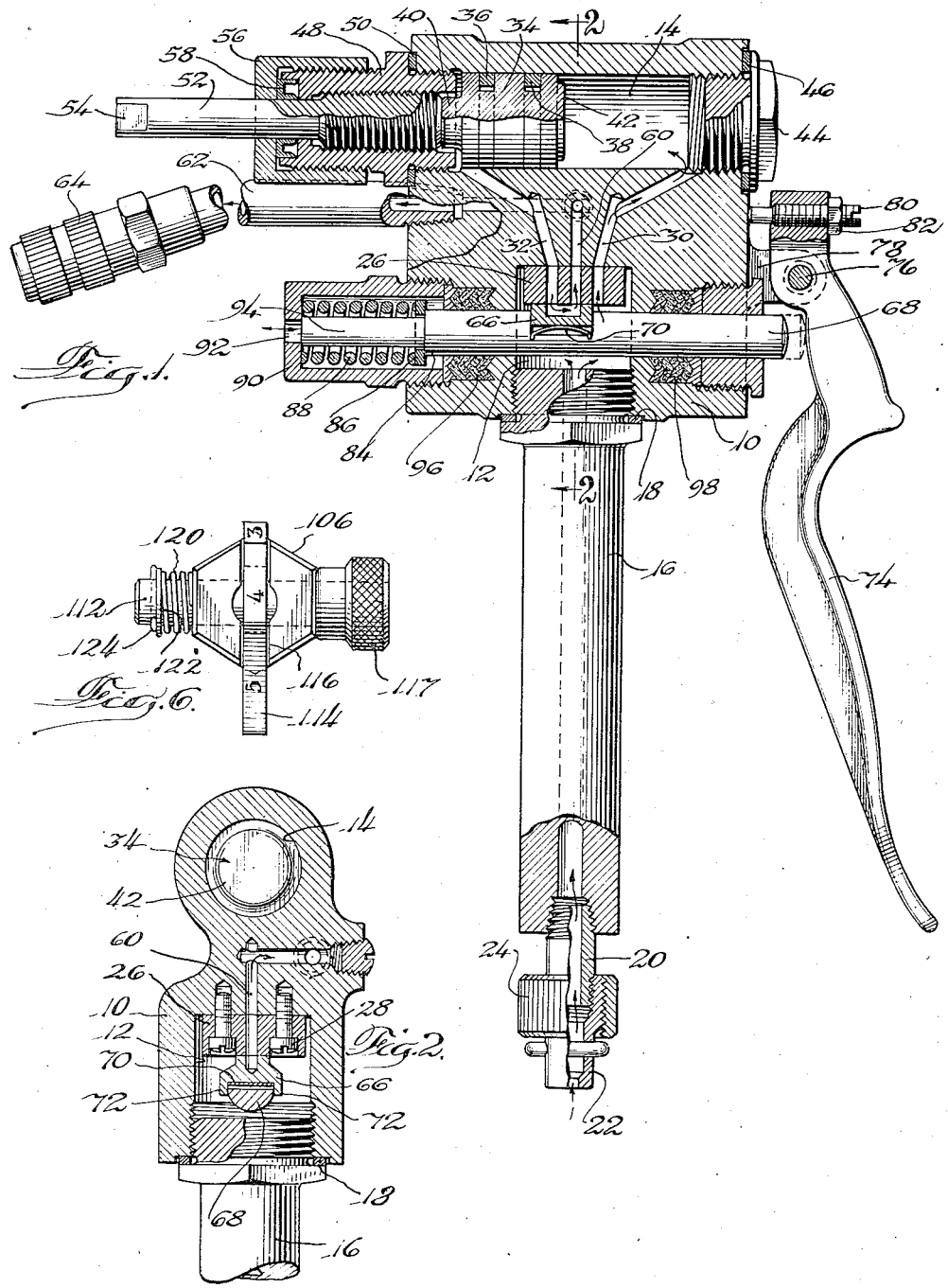

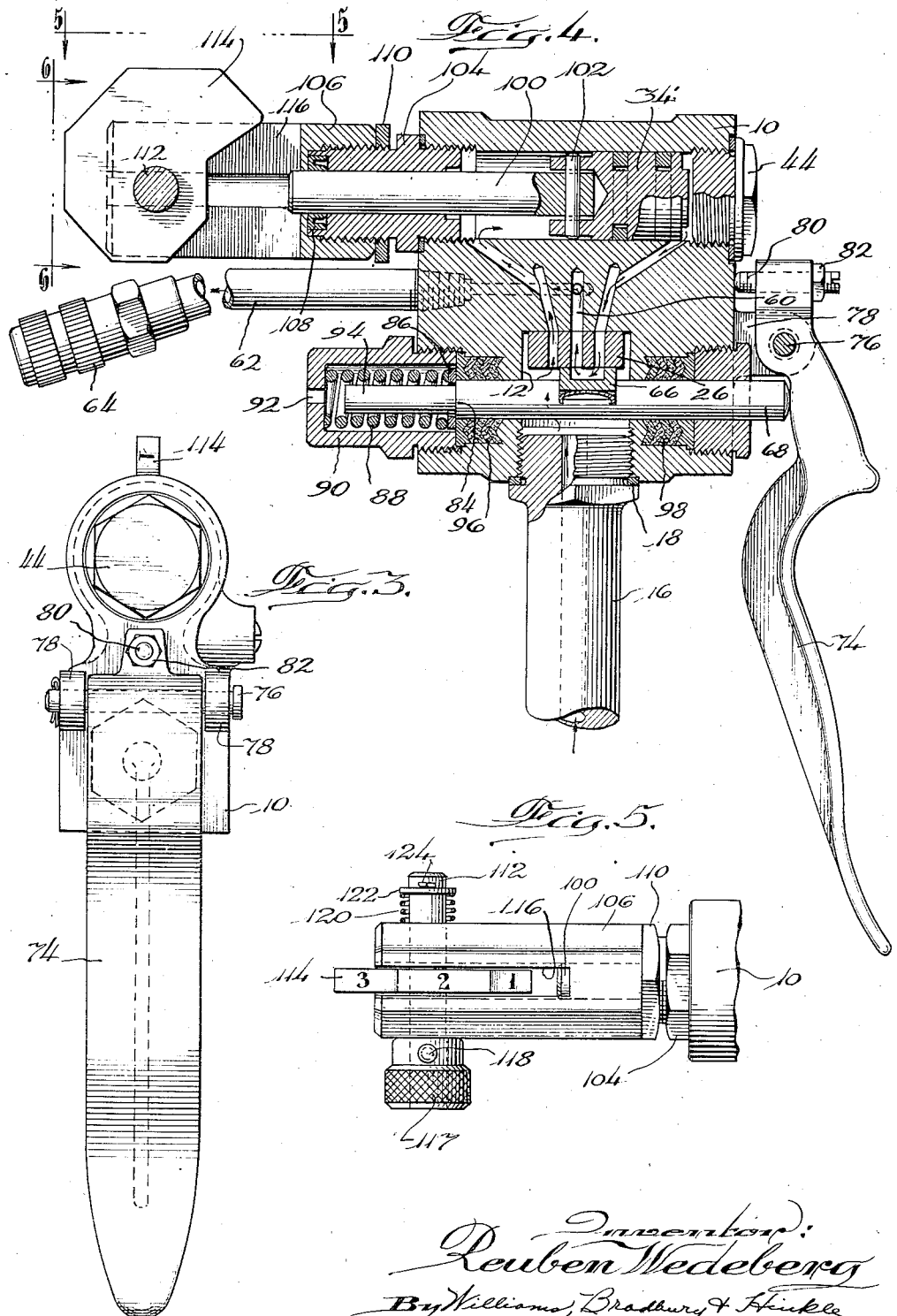

2,427,755

UNITED STATES PATENT OFFICE 2,427,755

LUBRICANT MEASURING VALVE

Reuben Wedeberg, Chicago, Ill., assignor to Stewart-Warner Corporation, Chicago, Ill., a corporation of Virginia Application December 27, 1943, Serial No. 515,863

6 Claims. (Cl. 222—250)

My invention relates to lubricant measuring valves and more particularly to a manually operated measuring valve for application to a power operated lubricant compressor.

In lubricating automobiles and similar machinery, it is common to utilize a power operated lubricant compressor having a discharge conduit terminating in a manually operated control valve which is opened after the compressor has been coupled to a fitting on the automobile or other machine to be lubricated and which is closed after the lubricating operation is completed. Such compressors are commonly provided with a pressure cut-off which stops the pump when a predetermined pressure is reached in the discharge conduit and which starts the compressor as soon as this pressure drops as a result of opening the control valve.

My invention pertains to such control valves and an object of my invention is to provide a new and improved control valve which will permit the operator accurately to measure the quantity of lubricant supplied to each bearing.

Another object of my invention is to provide a new and improved lubricant measuring valve having means for readily adjusting the quantity of lubricant delivered to each bearing.

Another object of my invention is to provide a new and improved lubricant measuring valve which is simple in construction, may be inexpensively manufactured, and is reliable and trouble-free in use.

Other objects and advantages will become apparent as the description proceeds.

In the drawings:

Fig. 1 is a longitudinal, sectional view through a preferred form of measuring valve embodying my invention;

Fig. 2 is a partial, transverse section taken on the line 2—2 of Fig. 1;

Fig. 3 is an elevational view looking at the measuring valve from the right in Fig. 1;

Fig. 4 is a partial view similar to Fig. 1, but showing a modified form of my invention;

Fig. 5 is a top plan view of the adjustable measuring means of Fig. 4 and is taken looking in the direction of the arrows 5—5 of Fig. 4; and Fig. 6 is an end view of the adjustable measuring means of Fig. 4 and is taken looking in the direction of the arrow 6—6 of that figure.

The adjustable measuring valve shown in Fig. 1 comprises a body 10 having a valve chamber 12 and a measuring chamber 14. A tube 16 is threaded into the body 10 with the bore of the tube in communication with the valve chamber 12 and a gasket 18 is interposed between the tube and body to form a fluid-tight seal therebetween. The other end of the tube 16 is provided with a nipple 20 terminating in a bayonet fitting 22 adapted to be inserted in a bayonet coupler attached to a hose of a power operated lubricant compressor. After the fitting 22 has been inserted in the bayonet coupler, a knurled sleeve 24 may be screwed against the end of the coupler to lock the fitting therein so that the tube 16 and body 10 become, in effect, a continuation of the discharge conduit of the lubricant compressor.

A port member 26 is located in the valve chamber 12 and is secured to the body 10 by screws 28. This port member and the body 10 provide one passageway 30 connecting the valve chamber 12 with the righthand end of the measuring chamber 14 and a second passageway 32 connecting the valve chamber with the opposite end of the measuring chamber. A plunger 34 is located in the measuring chamber 14 intermediate these passageways and prevents communication therebetween. This plunger is shown as provided with sealing rings 36 and 38 and reduced ends 40 and 42, which latter limit movement of the plunger 34.

One end of the measuring chamber 14 is closed by a plug 44 screwed into the body 10 and sealed therewith by a washer 46. A sleeve 48 is screwed into the body 10 to close the other end of the measuring chamber 14 and is sealed with the body by a washer 50. A plunger adjusting rod 52 is threaded into the sleeve 48 and engages the reduced end 40 of the plunger 34 to limit movement of this plunger. The rod 52 is provided with a flattened end 54 which may be engaged by a wrench or other tool to rotate the rod and thereby change the travel of the plunger 34. A cap 56 is threaded to one end of the sleeve 48 and encloses a sealing ring 58 which prevents escape of lubricant around the rod 52.

Valve block 26 and body 10 provide a third passage 60 leading to a discharge pipe 62 terminating in a coupling 64 adapted to make a quick detachable connection with a lubricant receiving fitting on the bearing of an automobile or other machine. A slide valve 66 controls communication between the valve chamber 12 and passageways 30 and 32 and also between these passageways and the discharge passageway 60. This slide valve is located in a recess formed in one side of a valve rod 68 and is urged against the valve block 26 by a spring 70. The valve 66 has ears 72 located on opposite sides of the rod 68 to prevent lateral displacement of the valve relative to this rod.

The valve 66 and valve rod 68 are moved in one direction by a handle 74 pivotally attached by a pin 76 to a pair of ears 78 integral with body 10. An adjustable stop pin 80 is screwed into one end of the handle 74 and engages the body 10 to determine the normal position of the handle, valve rod and valve. A lock nut 82 holds the stop pin 80 in adjusted position.

The valve rod 68 has a shoulder 84 engaging a washer 86 forming one abutment for a compression spring 88. The other end of this spring rests against the end of a cap 90 threaded into the body 10. This cap has a bleed opening 92 for escape of lubricant so that leakage of lubricant into the cap 90 can not interfere with operation of the valve rod 68. The spring 88 urges valve rod 68 toward the right, as viewed in Fig. 1, and normally holds the handle in the position shown in this figure. Leftward movement of the valve rod and handle is limited by engagement of the reduced lefthand end 94 of the valve rod with the end of cap 90. Packing glands 96 and 98 are provided to prevent or minimize leakage of lubricant from chamber 12 along the valve rod.

In Figs. 4, 5 and 6, I have shown a modified form of my invention utilizing a different adjusting means for varying the measured quantity of lubricant delivered for each operation of the valve. In this embodiment of my invention the measuring plunger 34' has a rod 100 pivotally attached thereto by a pin 102. This rod is slidable in the bore of a nipple 104 threadedly attached to the body 10. A hexagonal member 106 is threaded to one end of the nipple and a sealing ring 108 is confined therebetween to prevent leakage of lubricant along the rod 100. A lock nut 110 prevents accidental displacement of the hexagonal member 106 from the nipple 104. A shaft 112 is rotatably mounted in the member 106 and has a measuring cam 114 press fitted thereon so that the cam rotates with the shaft. This cam is located in a slot 116 formed in the hexagonal member 106 and is adapted to be engaged by the rod 100 to limit movement of this rod and the plunger 34'.

As clearly shown in Fig. 4, this cam has a series of rod engaging surfaces which may be selectively brought into rod engaging position and each of these rod engaging surfaces is illustrated as being marked with a number indicating its relative value in the series of eight engaging surfaces.

The shaft 112 and cam 114 are rotated by a knurled knob 117 attached to one end of the shaft 112 by a set screw 118. The shaft 112 and cam 114 are frictionally held in adjusted position by a spring 120 confined between the member 106 and a washer 122 resting against a cotter pin 124 passing through a hole drilled in the end of the shaft 112. While the particular cam shown has a configuration providing eight different rod engaging surfaces, other cams may be utilized having different numbers of rod engaging surfaces and different relationships between these surfaces.

Except as to the means for varying the measured charge of lubricant discharged for each operation of the valve, the operations of both forms of my measuring valves are identical. The normal position of the valve, valve rod, handle and plunger is shown in Fig. 4. In this position of the parts the lubricant compressor is in open communication with the valve chamber 12, passage 32 and lefthand end of the measuring chamber 14. The discharge passageway 60, however, is not in communication with the passageway 32, but is only in communication with the passageway 30 and the plunger prevents communication between the passageways 30 and 32. Since the plunger is at its extreme righthand position, lubricant pressure on the lefthand end of this plunger creates no flow of lubricant to the nozzle 64 and the pressure switch of the lubricant compressor maintains the discharge conduit and communicating passages under maximum pressure.

When the operator applies the nozzle 64 to a lubricant receiving fitting and closes his hand about the pipe 16 and handle 74, valve 66 and valve rod 68 are shifted to the position shown in Fig. 1, thereby connecting the lefthand end of the measuring valve chamber with the discharge passageway 60 and connecting the righthand end of the measuring valve chamber with the lubricant compressor. The force exerted by the lubricant on the righthand end of the measuring valve plunger moves this plunger to the left and forces lubricant from the lefthand end of the measuring valve chamber toward the bearing being lubricated. The volume of lubricant discharged into the bearing is determined by the length of travel of the plunger 34. In Fig. 1, this is controlled by the position of the threaded rod 52, whereas in Fig. 4 this is determined by the position of the cam 114. Upon release of the handle 74, the parts return to the position shown in Fig. 4 and a second and equal quantity of lubricant is delivered to the bearing. The operator then disconnects the coupler 64 from the lubricant receiving fitting of the bearing which has just been lubricated, applies this nozzle to a fitting of a second bearing, and repeats the operation.

From the foregoing description of my invention, it will be apparent that in either embodiment of my invention the quantity of lubricant discharged for each operation of the measuring valve can be readily determined so that the quantity discharged to each bearing is predetermined. In the embodiment of Fig. 1, this adjustment is infinitely variable within the limits of the measuring valve, whereas in the embodiment of Fig. 4 the number of variations in the stroke of the plunger is predetermined by the cam 114. In either form of my invention any multiple of the quantity for which the measuring valve is set may be delivered to a bearing by repeatedly operating the handle 74 while the coupler 64 remains attached to the same bearing. Likewise, a half measure could be delivered to a particular bearing by merely moving the handle toward the pipe 16 and holding the handle in this position while the coupler 64 is transferred to another bearing. The occasion for such abnormal operation, however, would be extremely rare and in normal operation the plunger stroke would be adjusted to give the desired quantity of lubricant for each complete cycle of handle operation.

While I have illustrated and described in detail only two embodiments of my invention, it is to be understood that my invention is not limited to the particular details shown and described, but may assume numerous other forms and that my invention includes all modifications, variations and equivalents coming within the appended claims.

I claim:

1. A measuring valve of the class described, comprising a body providing a valve chamber and a measuring chamber, means for supplying lubricant under pressure to said valve chamber, passageways connecting said valve chamber with opposite ends of said measuring chamber, a plunger reciprocable in said measuring chamber to displace lubricant therefrom, said plunger preventing flow of lubricant between opposite ends of said measuring chamber, a discharge passageway adapted to be connected to a bearing requiring lubricant, a valve controlling communication between said passageways and said valve chamber, means for shifting said valve, a rod pivotally attached to said plunger, and a single rotatable cam adapted to engage and limit movement of said rod, said cam having a plurality of rod engaging faces adapted to be selectively brought into rod engaging position to vary the stroke of said plunger.

2. A lubricant measuring valve of the class described, comprising a casting having a valve chamber and a measuring chamber formed therein, said casting providing a pair of passageways connecting said valve chamber with opposite ends of said measuring chamber and a discharge passageway adapted to be brought into communication with either of said pair of passageways, a slide valve for connecting said discharge passageway with either of said pair of passageways and for controlling communication between said valve chamber and said pair of passageways, a piston rod for shifting said valve, said rod having a recess in one side thereof for receiving said valve, a spring confined between said valve and rod, a handle for moving said rod in one direction, a spring for moving said rod, an abutment for limiting movement of said rod and handle under the force of said spring, a pipe attached to said body and adapted to supply lubricant under pressure to said valve chamber, a plunger located in said measuring chamber and preventing communication between the opposite ends thereof, said plunger being reciprocable in said measuring chamber to displace lubricant therefrom, and means for adjusting the stroke of said plunger to predetermine the quantity of lubricant discharged by said measuring valve for each operation of said handle.

3. A lubricant measuring valve of the class described, comprising a body having a valve chamber and a measuring chamber formed therein, said body providing a pair of passageways connecting said valve chamber with opposite ends of said measuring chamber and a discharge passageway adapted to be brought into communication with either of said pair of passageways, a slide valve for connecting said discharge passageway with either of said pair of passageways and for controlling communication between said valve chamber and said pair of passageways, a piston rod for shifting said valve, said rod having a recess in one side thereof for receiving said valve, a spring confined between said valve and rod, a handle for moving said rod in one direction, a spring for returning said rod, an abutment for limiting movement of said rod and handle under the force of said spring, a pipe attached to said body and adapted to supply lubricant under pressure to said valve chamber, a plunger located in said measuring chamber and preventing communication between the opposite ends thereof, said plunger being reciprocable in said measuring chamber to displace lubricant therefrom, a nipple attached to said body, a rod slidable in said nipple and attached to said plunger, a cam support attached to said nipple, and a cam adjustably carried in said support for variably limiting the movement of said last-named rod and plunger.

4. A lubricant measuring valve of the class described, comprising a body having a valve chamber and a measuring chamber formed therein, said body providing a pair of passageways connecting said valve chamber with opposite ends of said measuring chamber and a discharge passageway adapted to be brought into communication with either of said pair of passageways, a slide valve for connecting said discharge passageway with either of said pair of passageways and for controlling communication between said valve chamber and said pair of passageways, a piston rod for shifting said valve, said rod having a recess in one side thereof for receiving said valve, a spring confined between said valve and rod, a handle for moving said rod in one direction, a spring for returning said rod, an abutment for limiting movement of said rod and handle under the force of said spring, a pipe attached to said body and adapted to supply lubricant under pressure to said valve chamber, a plunger located in said measuring chamber and preventing communication between the opposite ends thereof, said plunger being reciprocable in said measuring chamber to displace lubricant therefrom, a cam support attached to said body, a shaft rotatably mounted in said support, a multifaced cam affixed to said shaft, a handle for rotating said shaft and cam, means for holding said cam in adjusted position, and means movable with said plunger and engageable with said cam to limit movement of said plunger.

5. A lubricant measuring valve of the class described, comprising a casting having a valve chamber and a measuring chamber formed therein, said casting providing a pair of passageways connecting said valve chamber with opposite ends of said measuring chamber and a discharge passageway adapted to be brought into communication with either of said pair of passageways, a slide valve for connecting said discharge passageway with either of said pair of passageways and for controlling communication between said valve chamber and said pair of passageways, a piston rod for shifting said valve, said rod having a recess in one side thereof for receiving said valve, a spring confined between said valve and rod, a handle for moving said rod in one direction, a spring for returning said rod, an abutment for limiting movement of said rod and handle under the force of said spring, a pipe attached to said body and adapted to supply lubricant under pressure to said valve chamber, a plunger located in said measuring chamber and preventing communication between the opposite ends thereof, said plunger being reciprocable in said measuring chamber to displace lubricant therefrom, a sleeve attached to said body in alignment with said measuring chamber, a stop member for said plunger adjustably threaded in said sleeve, a cap attached to said sleeve, and sealing means mounted in said cap and surrounding said member.

6. A lubricant measuring valve of the class described, comprising a body having a valve chamber and a measuring chamber formed therein, said body providing a pair of passageways connecting said valve chamber with opposite ends of said measuring chamber, and a discharge passageway adapted to be brought into communication with either of said pair of passageways, a slide valve for connecting said discharge passageway with either of said pair of passageways and for controlling communication between said valve chamber and said pair of passageways, a piston rod for shifting said valve, a handle for moving said rod in one direction, means for returning said rod, a pipe attached to said body and adapted to supply lubricant under pressure to said valve chamber, a plunger located in said measuring chamber and preventing communication between the opposite ends thereof, said plunger being reciprocable in said valve chamber to displace lubricant therefrom, a sleeve attached to said body in alignment with said measuring chamber, a stop member for said plunger adjustably threaded in said sleeve, a cap attached to said sleeve, and sealing means mounted in said cap and surrounding said member.

REUBEN WEDEBERG.

REFERENCES CITED

The following references are of record in the file of this patent:

UNITED STATES PATENTS

| Number | Name | Date |
|---|---|---|
| 1,083,006 | De Wein | Dec. 30, 1913 |
| 539,743 | Jenkins | May 21, 1895 |
| 1,191,663 | Candee | July 18, 1916 |
| 1,782,704 | Woodruff | Nov. 25, 1930 |
| 1,979,428 | Wheeler | Nov. 6, 1934 |

FOREIGN PATENTS

| Number | Country | Date |
|---|---|---|
| 235,587 | Great Britain | Apr. 1, 1926 |